United States Patent [19]
Myers et al.

[11] 4,373,111
[45] Feb. 8, 1983

[54] SERVICE POLES

[75] Inventors: John L. Myers, Parkersburg; Richard D. Benscoter, Vienna, both of W. Va.; Bruce B. Chambers, Belpre; Ralph E. Dyar, Marietta, both of Ohio

[73] Assignee: Butler Manufacturing Company, Kansas City, Mo.

[21] Appl. No.: 141,963

[22] Filed: Apr. 21, 1980

[51] Int. Cl.³ .............................................. H02G 3/04
[52] U.S. Cl. ................................................... 174/48
[58] Field of Search ..................... 174/48, 49; 362/431; 52/220, 221

[56] References Cited

U.S. PATENT DOCUMENTS

| | | | |
|---|---|---|---|
| 3,888,282 | 6/1975 | Liddall | 174/48 X |
| 3,889,044 | 6/1975 | Flachbarth et al. | 174/48 |
| 4,015,397 | 4/1977 | Flachbarth et al. | 174/48 X |
| 4,092,486 | 5/1978 | Myers | 174/48 |
| 4,178,468 | 12/1979 | Jorgensen et al. | 174/48 |

Primary Examiner—B. A. Reynolds
Assistant Examiner—D. A. Tone
Attorney, Agent, or Firm—Frederick J. Olsson

[57] ABSTRACT

Service poles having improved structures, namely: extruded aluminum frame with special slots to removably retain covers and to mount receptacle retainers; pole hanger adapted for use with various sizes of poles and also adaptable to secure pole to a ceiling panel T-bar suspension system or alternatively to a floor supported suspension rod; base adapting pole for use on tile or carpet; ceiling tile trim plate adaptable for use with various sizes of poles and for use regardless of the point where the pole passes thru the ceiling panel; retainers for supporting single and duplex receptacles.

3 Claims, 15 Drawing Figures

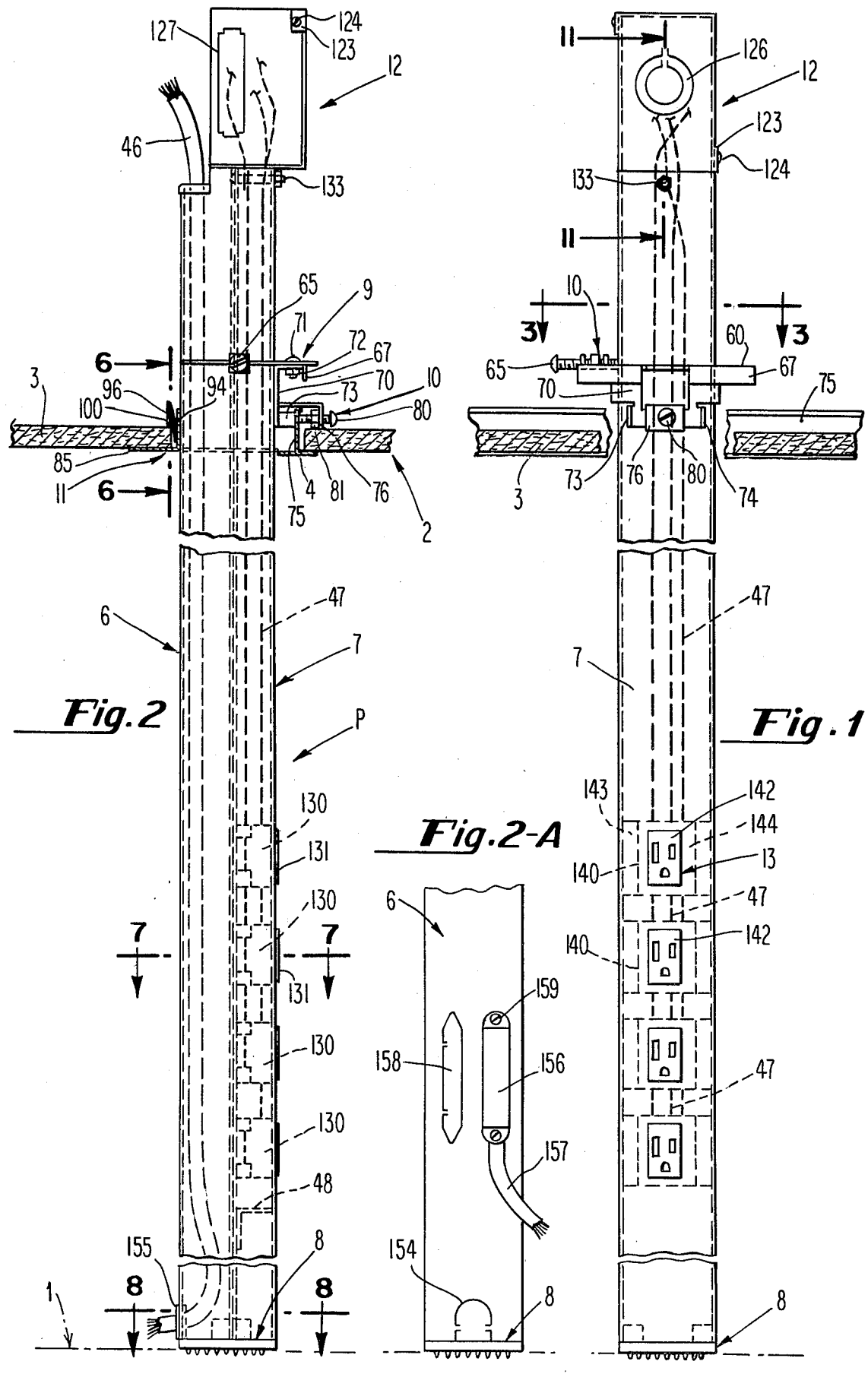

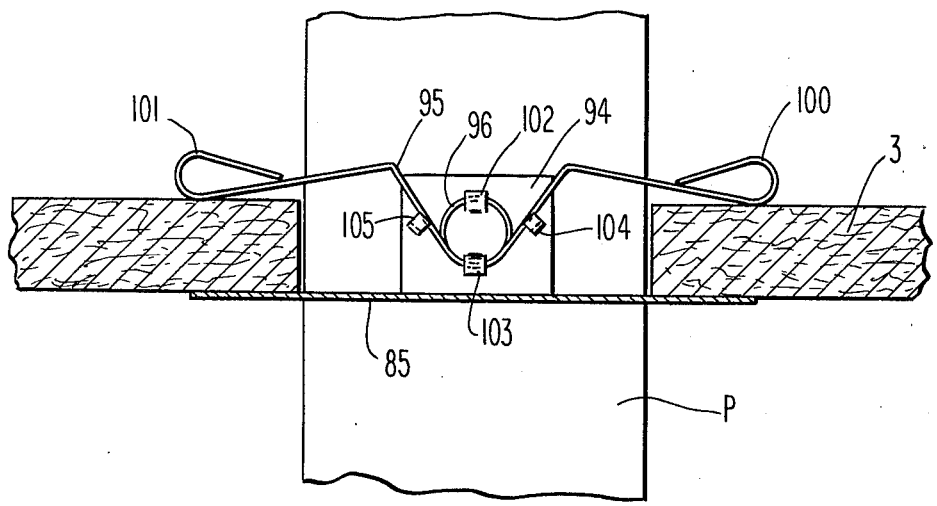
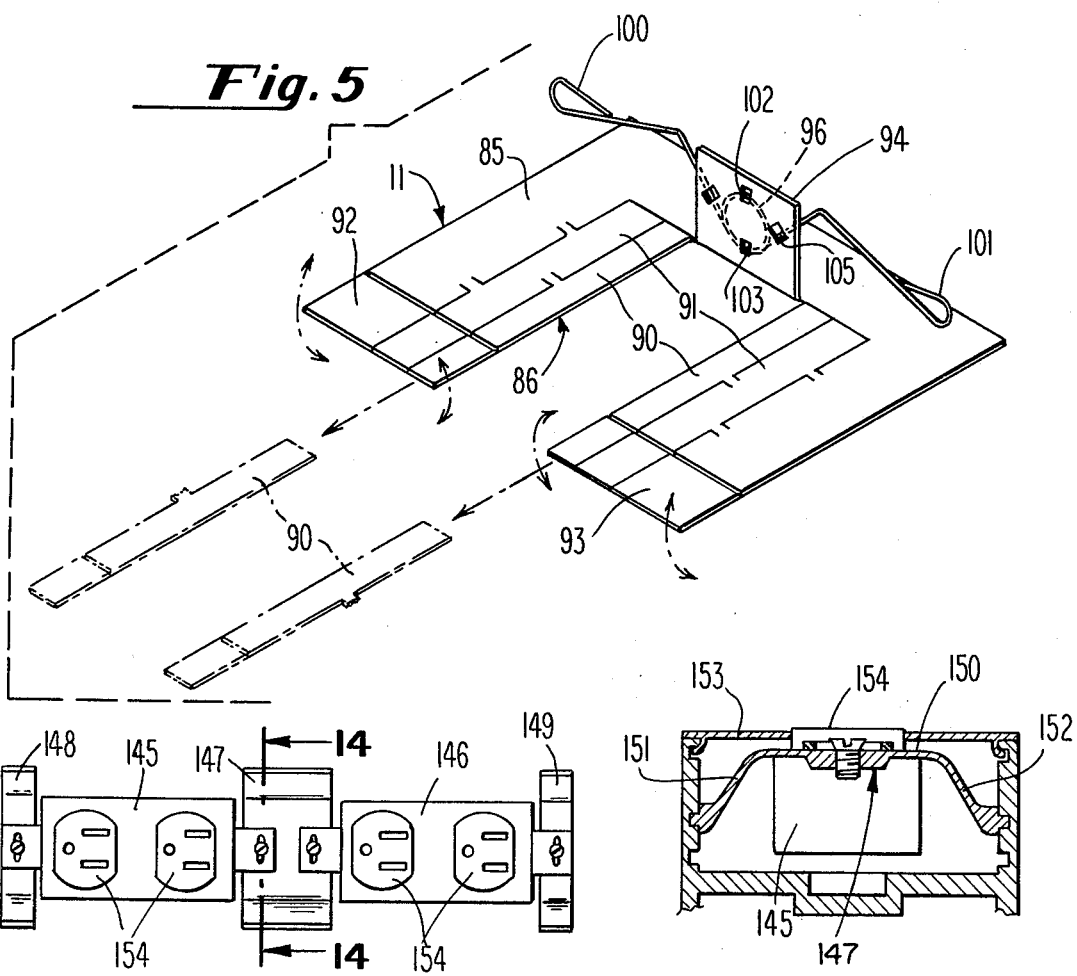

SERVICE POLES

This invention relates to electrical and communication distribution systems for buildings or the like and in particular relates to improvements in poles which provide power and/or telephone service in the rooms of buildings.

More specifically, the invention relates to improvements in service poles of the kind shown in U.S. Pat. Nos. 3,889,044, 4,015,397 and 4,092,486 all of which are assigned to the assignee of this invention.

One of the objects of the invention is to provide for poles of the kind in question and extruded aluminum frame having a pair of back-to-back, conductor-carrying channels whose side walls are uniquely slotted to provide for mounting of covers and receptacle retainers and to provide for flexing to aid in the installation and removal of the covers and the positioning of the receptacle retainers.

Another object of the invention is to provide a power feed box for the top of a pole of the kind in question which effects substantial cost saving by being adaptable without modification to several sizes of poles and which is structured to be used with overhead distribution systems employing metal flexible conduit or with proprietary systems employing plug-in connectors.

Another object of the invention is to provide a trim plate for poles of the kind in question which obtains substantial cost savings by being readily adaptable for use with several sizes of poles and for use whether the pole enters the ceiling panel along an edge or inboard thereof and which is structured to be aesthetically acceptable by making a snug fit with the underside of the ceiling panel in all applications.

Another object of the invention is to provide a pole hanger for poles of the kind in question which is structured to be fabricated from stamped parts and to be readily adaptable for use with more than one size pole to thereby obtain cost saving.

Another object of the invention is to provide a receptacle retainer for poles of the kind in question which is formed and mounted on the pole so that assembly time for the power receptacles is held to a minimum and has a structure conducive to low tooling cost.

The improvements will be described below in connection with the following drawings wherein.

FIG. 1 is an elevational view of a pole incorporating the improvements of the invention;

FIG. 2 is an elevational view looking toward the right in FIG. 1;

FIG. 2A is a fragmentary view showing the bottom of the pole looking toward the right in FIG. 2 in a modified arrangement.

FIG. 5 is a perspective view of an improved trim plate;

FIG. 6 is an enlarged view taken along the lines 6—6 of FIG. 2 and showing a cross-section of the trim plate;

FIGS. 13 and 14 are respectively plan and sectional, elevational views of a duplex receptacle arrangement.

Figure 3:
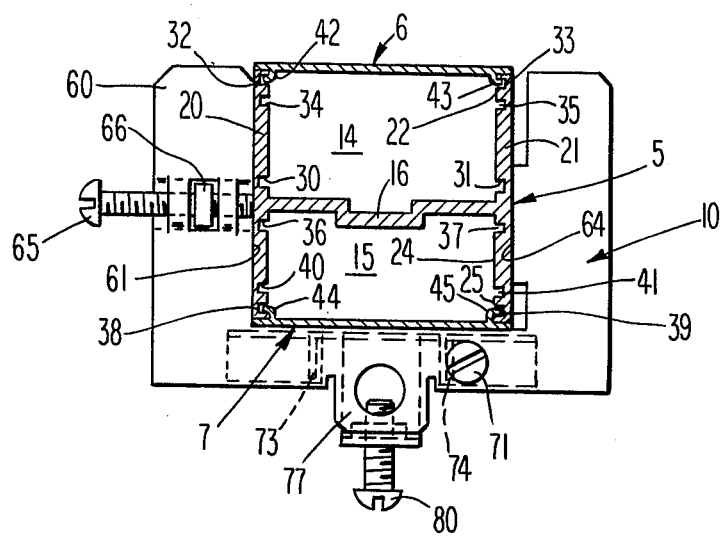
FIG. 3 is a view taken along the lines 3—3 of FIG. 1.
Figure 4:
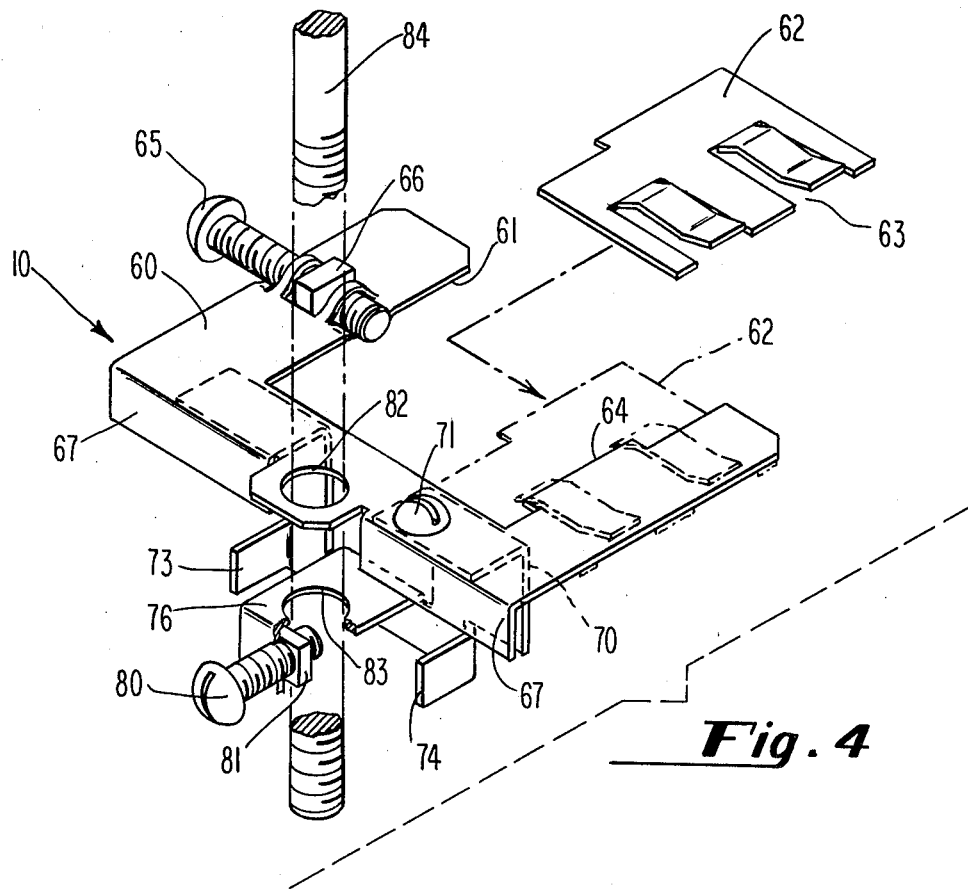
FIG. 4 is a perspective view of an improved pole hanger.

In FIGS. 1 and 2, the pole P of the invention extends from the floor 1 up to and thru the suspended ceiling 2 of a building room. The ceiling 2 comprises panels 3 in a T-bar grid 4 which is suspended from the underside of the next upper floor by conventional suspension or hanger rods.

The major components of the pole are: H-shaped frame 5 (FIG. 3) covers 6 and 7, base 8 (FIGS. 1 and 2) pole hanger 10, trim plate 11, end feed or junction box 12 and receptacles 13.

Referring to FIG. 3, the frame 5 is an aluminum extrusion with back-to-back channels 14 and 15. The channel 14 comprises the base 16 and side walls 20 and 21 extending away from the base and forming an opening 22. The channel 15 comprises the same or common base 16 and side walls 23 and 24 extending away from the base and forming opening 25. The openings 23 and 25 face outwardly in opposite directions.

The walls 20 and 21 have inner slots 30 and 31, outer slots 32 and 33 and intermediate slots 34 and 35. The various slots are co-extensive with the sidewalls. The several pairs of slots face one another.

The inner slots 30 and 31 are for use in permitting the side walls 20 and 21 to flex or tilt with respect to the base 16 for inserting or removing cover 6. The outer slots 32 and 33 are for use in mounting the cover 6. The intermediate slots 34 and 35 are for use in mounting a receptacle. In channel 15, the side walls 23 and 24 has inner slots 36 and 37, outer slots 38 and 39 and intermediate slots 40 and 41 which serve the same, respective purposes as the slots 30–35.

The cover 6 is removably mounted on the outer edges of side walls 20 and 21. The cover has a pair of fingers 42 and 43 (co-extensive with the cover) which respectively engage the inside of said side walls 20 and 21 and have rounded heads which enter and engage outer slots 32 and 33. The transverse distance between the side walls 20 and 21 is less than the transverse distance between the fingers 42 and 43 so that the side walls 20 and 21 must be flexed or spread apart to permit entry of the fingers and after entry remain somewhat flexed. This flexed condition generates holding force to maintain the cover in place. The holding force, however, permits the cover to be pried loose for removal purposes.

The cover 7 has similar fingers 44 and 45 in cover slots 38 and 39 which function the same way as the fingers 42 and 43 of cover 6.

To install the cover, the normal procedure is to place the head of one finger in one slot and then press down on the opposite side of the cover so that the finger on the opposite side goes into position.

The channels 14 and 15 and covers 6 and 7 form compartments for carrying power conductors and telephone cable. In the instant case, the compartment 14 is for a telephone cable as indicated at 46 and the compartment 15 is for power conductors as indicated at 47. A barrier 48 connected to the common base 16 is used at the bottom of the power compartment. The function of the compartment may be reversed as will be noted later.

Figure 8:
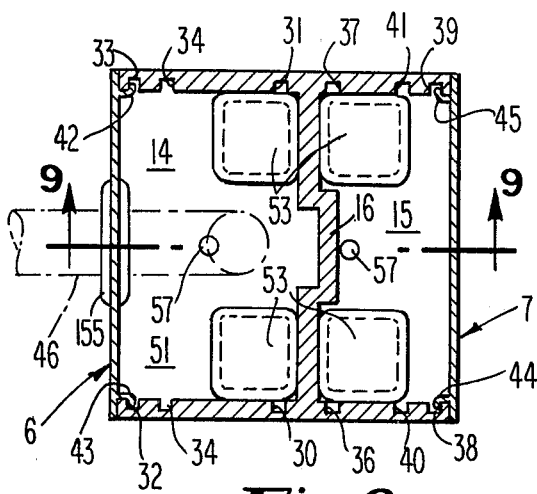
FIG. 8 is a view taken along the lines 8—8 of FIG. 2 showing the base structure.
Figure 10:
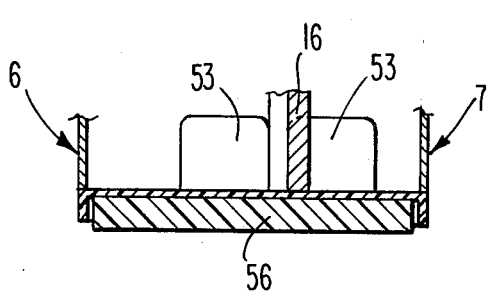
FIG. 10 is a fragmentary view of a modified base for the poles.
Figure 9:
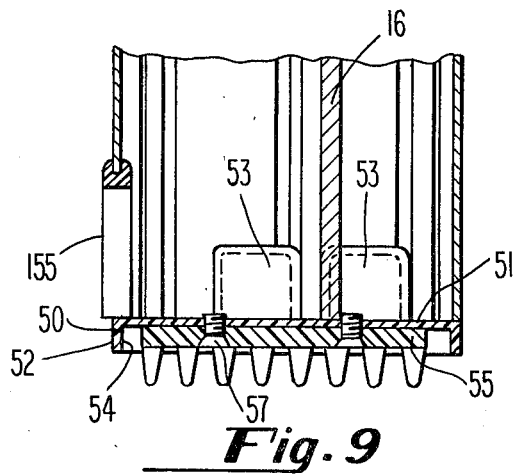
FIG. 9 is a fragmentary view taken along the lines 9—9 of FIG. 8.

The base 8 provides for the poles to be mounted either on a floor covering of tile or of carpet. The details of the base are shown in FIGS. 8, 9 and 10.

A foot 50 has a flat top 51 and downwardly extending side 52. The top 51 is engaged with the bottom edges of the side walls 20/21 and 23/24 of the frame and the covers 6 and 7. The foot is formed with mesas 53 which firmly engage the common base 16 of the frame 5 and hold the foot in position. Preferably, the foot is molded of high impact polyethylene which permits relaxed tolerances while retaining the press-fit characteristic.

The top 51 and side 52 form a cavity which is adapted to receive the carpet plate 55 (FIG. 9) also molded of high density polyethylene or the tile plate 56 (FIG. 10) made of rubber or neoprene. The carpet and tile plates are held to the foot as by the screws 57.

The hanger 10 which provides top support for the pole will be described particularly in connection with FIGS. 1, 2, 3, and 4.

The top plate 60 is formed with rectangular opening 61 to accept the pole P. An adaptor 62 has spring fingers 63 by means of which the adaptor can be removably mounted on edge 64 of the opening 61 as indicated by the dotted lines 62 in FIG. 4. With the adaptor 62 removed, the opening is conditioned to accept a large pole and with the adaptor in place the opening is reduced in cross section and is conditioned to accept a smaller pole.

The pole and hanger are secured together by the bolt 65 operating in the nut 66 captured on the plate 60. As shown in FIG. 3, the bolt bears on the joinder area of side walls 20 and 23 and pushes side walls 21 and 24 against the edge 64.

The top 60 has a downwardly extending strengthening flange 67. A bracket 70 is secured to the underside of the plate 60 as by the bolt 71 operating in a nut 72 (FIG. 2) captured between the flange 67 and the bracket. The bracket 70 has two abutments 73 and 74 which are adapted to engage the leg 75 of a T-bar of grid 4. The bracket 70 has an elbow 76 which carries the bolt 80 and nut 81 threaded thereon. The nut is prevented from turning by engagement with the elbow.

When the hanger is positioned with abutments 73 and 74 engaging the leg 75 (FIGS. 1 and 2) the bolt 80 can be turned so that it engages the leg 75 and firmly locks the same against the abutments.

Where the pole goes thru the ceiling panel 3 at some inboard position so that the T-bar system is not available, the pole hanger 10 may be employed to support the pole by being connected with a threaded suspension rod connected to the underside of the next higher floor of the building.

The means for accomplishing the above is provided by the aligned holes 82 and 83 respectively in the top 60 and in the elbow 76. With the bolt 80 and nut 81 removed or backed off the pole hanger 10 is positioned with the threaded suspension rod 84 extending through the holes 82 and 83. A pair of nuts (not shown) are threaded on the rod to respectively engage the top and bottom side of the top plate 60.

Normally, when the hanger 10 is connected to a threaded suspension rod 84, the hanger 10 is secured to the pole on the opposite side of that shown in FIGS. 1 and 2. This insures clearance between the end feed box 12 and the suspension rod 84.

The trim plate 11 which is employed to cover the space between the pole and the ceiling panel opening for the pole will next be described particularly in connection with FIGS. 5 and 6.

A flat base 85 has rectangular, inwardly extending opening 86 for receiving poles. The size of the opening can be changed for different size poles by leaving the inboard break-away sections 90 and 91 intact or removing the same. Depending on the size pole with which the plate is used, the outboard breakaway sections 92 and 93 are left intact or removed.

The base 85 mounts an upwardly extending flange 94 which mounts a leaf spring 95. The spring has a center coil section 96 and arms 100 and 101. The coil is retained by a pair of upper and lower L-shaped tabs 102 and 103 and the coil forces the arms 100 and 101 down against the L-shaped tabs 104 and 105.

To install the trim plate 11 the arms 100 and 101 are held between the thumb and forefinger and rotated toward each other so that the arms and flange 94 can be inserted up into the space between pole and ceiling panel. Then the arms are released so that they bear down on the panels as noted in FIG. 6. It will be noted that flange 94 extends into space between the pole and the opening in the ceiling panel.

The spring is made sufficiently strong so as to draw the flat base 85 up tight against the ceiling panel and covers the space between pole and panel. The trim plate is removed by manually relaxing the spring by rotating arms 100 and 101 toward each other, dropping flat plate 85 away from ceiling and pulling same down through opening in the suspended ceiling.

The trim plate performs its covering or concealing function in any of the several positions of the pole opening in the ceiling panel, for example, at the juncture of two T-bars, or along one of the bars, or inboard of the ceiling panel away from the T-bar system. In the latter case, two trim plates mounted on opposite sides of the pole have their adjacent edges abutting or overlapping.

The end feed box 12 serves as a junction box for splicing or connecting the power line 47 inside the pole to the overhead distribution system which may comprise flexible, metal-sheathed cable or a plug-in system such as shown in U.S. Pat. No. 3,719,768 owned by the assignee of this invention. The end feed box will be described particularly in connection with FIGS. 11 and 12.

The end feed box has cube-shaped part 106 and a L-shaped part 107 which forms a cover. The cube part 106 has a closed top 110 three closed sides 111, 112, 113 and open side 114. The latter side provides access and is closed off by cover 107. The cube has a bottom which is partly closed as noted at 115 and partly open as noted at 116.

The end feed box is mounted on the poles so that the sides 111 and 113 and a portion of the open bottom 116 overhang or are offset from the pole.

The closed portion 115 has a downwardly extending flange 117 which is connected to the base 16 as will be noted shortly. The flange maintains the box on the pole.

The L-shaped cover 107 has a foot 120 and a leg 121. The foot 120 has a cut out section 122 and is configured so that when joined with cube 106 (FIG. 11) the cut out 122 provides for communication between the compartment 15 and the interior of the end feed box and also provides a closure means for the overhang. The leg 121 has fastening flanges 123 which accept self tapping screws 124 to secure the cover in the position of FIG. 11. As noted, the cover 107 closes off the open side 114.

The cover is normally provided with the knock-out 125 to accept a metallic, flexible cable connector.

The cube part 106 is provided with a knock-out 126 the same as knock-out 125. It is also provided with a knock-out 127 on side 111 and a knock-out 128 on side 113. The knock-outs 125 and 126 are for flexible metal sheath connectors. The knock-outs 127 and 128 are for connectors of the type shown in U.S. Pat. No. 3,719,768. In each case, two connectors are provided so that power can be run into and out of a pole.

It will be noted that the top of the pole for communications compartment 14 is undercut at 130 and has a grommet 131. The undercut provides sufficient space for the passage of an amphenol connector.

Figure 11:
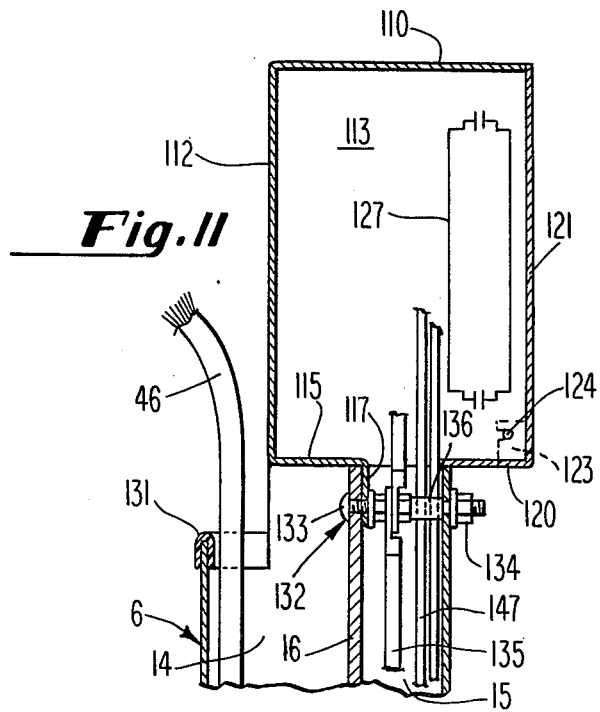
FIG. 11 is a view taken along the lines 11—11 of FIG. 1 showing the end feed box.
Figure 12:
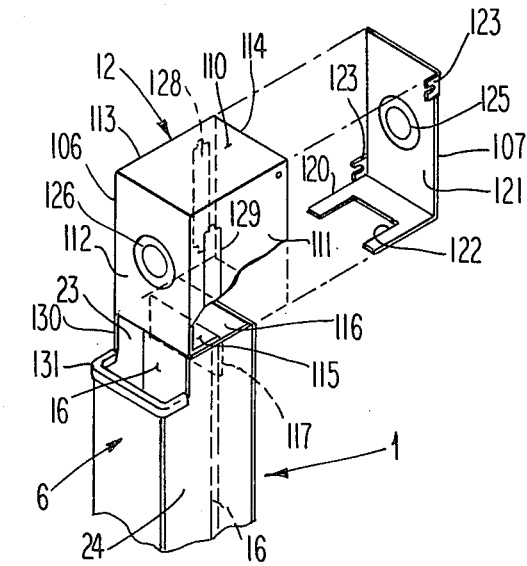
FIG. 12 is an exploded view, reduced in size, of the end feed box.

With reference to FIG. 11, the flange 117 is joined to the common base 16 by the grounding assembly 132. The assembly includes the bolt 133 which extends thru apertures in the base 16 and cover 7 and is held in place by nut 134. The grounding wires 135 are held on the assembly by the various spacers 136. In this arrangement, the frame 5, both covers 6 and 7 and the end feed box are all positively grounded.

A harness comprising the receptacles 13 and power conductors 47 is fabricated to make a unitary assembly prior to insertion in the power compartment 15. The harness is retained and positioned in the power compartment 15 by retainers 140 there being one retainer for each receptacle. The retainers are made of steel so as to be flexible.

Figure 7:
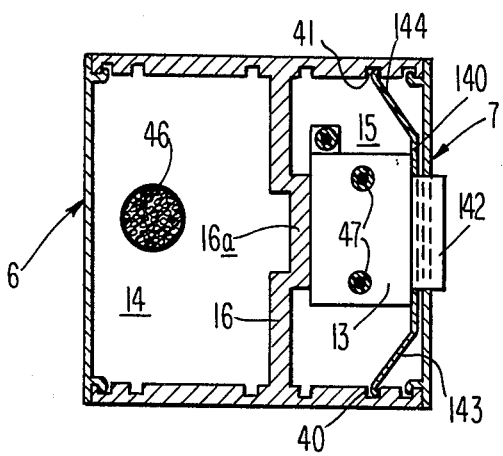
FIG. 7 is a view taken along the lines 7—7 of FIG. 2 showing one way of mounting receptacles.

As best noted in FIG. 7 each retainer has a flat section 141 which is apertured to receive the receptacle head 142. A pair of legs 143 and 144 angularly extend away from the flat section and opposite edges engage the slots 40 and 41. The distance between the edges of the retainer is greater than the distance between the slots 40 and 41 so that legs (or side walls) must be flexed for the edges to enter the slots. Upon release, the edges make a positive, force fit. The inboard section of each receptacle bottoms on base 16.

For normal assembly, the pole is positioned horizontally and the harness laid in with the receptacles engaging the common base 16. A retainer is placed over each receptacle with one edge in one or the other of the slots 40 and 41 and the opposite edge (or the frame side walls) flexed and the edge inserted in the other slot. The cover 7 is then placed in position, the cover being provided with apertures to accept the heads 142 of the receptacles. It will be apparent that the receptacles remain in position when the cover is removed.

In passing it is pointed out that the off-set 16a in base 16 is employed to serve as a support for the receptacles.

Rather than using single receptacles as above noted, duplex-type receptacles may be employed with the poles. For such purposes, some modifications are required as discussed below. The depth of the usual duplex requires that the same be mounted in the deeper channel 14. So when the deeper channel 14 becomes the power compartment, the channel 15 is used for the telephone compartment. With such a switch, the top of the channel 14 is not undercut as noted at 130 but the top of channel 15 may be provided with such an undercut. The end feed box 12 and grounding assembly 132 are reversed in position on the pole. The duplex receptacles require appropriate modification of the cover apertures to receive the receptacle heads.

Also, the duplex receptacles are provided with a different type of retainer and method assembly then as heretofore described. The change will be noted in connection with FIGS. 13 and 14.

In FIG. 13 the ears of duplex receptacles 145 and 146 are respectively screwed to center retainer 147 and outboard retainers 148 and 149.

The retainers are made from an aluminum extrusion so they are identical in cross section and are cut so that the inboard retainer 147 is wider than the outboard retainers 148 and 149.

The cross sectional shape is similiar to retainers 140 having a flat section 150 and legs 151 and 152 which extend out at an angle. The legs are not intended to flex.

The retainers and receptacles are joined as noted in FIG. 13 and connected with conductors to run through the power compartment of the pole. The assembly is mounted in the poles by sliding the outer edges of the retainers along the intermediate grooves 34 and 35 to the desired axial position. The retainers make a snug but sliding fit. When the cover 153 is installed, the heads 154 of the receptacles extend thru the cover apertures.

Turning back to the single receptacle arrangement it will be noted that the telephone cable 46 can exit from the compartment 14 by removing a knock-out 154 (FIG. 2A) in the bottom of the cover 6 and installing a grommet 155 to accept the cable. Alternatively, the cable can exit by terminating inside the compartment in an amphenol section which is joined to a amphenol section 156 which is positioned on the cover 6 as by removing a knock-out the same as 158, knock-out installing the amphenol section and then securing with self-tapping screws 159.

We claim:

1. A service pole for supplying power and/or telephone outlets in a room of a building structure, the pole being adapted to extend between the floor and the ceiling of a room and the ceiling being the suspended type having means for supporting ceiling panels, the pole comprising:

an elongated, extruded aluminum frame formed with a pair of back-to-back channels, each channel having a base and a pair of spaced-apart parallel side walls extending away from the base and forming an opening, the respective openings facing outwardly in opposite directions and the base of each channel being common to one another;

in each channel, the inside of each side wall having an inner slot located adjacent the base to provide for flexing of the side wall, an outer slot located closely adjacent the outer end of the wall for use in mounting a cover for the channel and an intermediate slot being inboard of the second slot being for use mounting a receptacle retainer, the respective inner, outer and intermediate slots facing one another;

a pair of covers respectively removably mounted on said side walls and extending across the openings of said channels to close off the same and each said opening providing access to its channel with the cover removed and the channels and covers forming elongated compartments for carrying electrical conductors; and each cover being removably mounted on the outer ends of the side walls by a pair of fingers disposed on the inside of the cover adjacent opposite edges and respectively engaged with the inside of said side walls and with said outer slots, the transverse dimension between the fingers being greater than the distance between the side wall whereby the side walls are outwardly flexed and provide inwardly directed force on the fingers for holding the cover in place.

2. A service pole for supplying power and/or telephone outlets in a room of a building structure, the pole being adapted to extend between the floor and the ceiling of a room and the ceiling being the suspended type having means for supporting ceiling panels, the pole comprising:
  an elongated, extruded aluminum frame formed with a pair of back-to-back channels, each channel having a base and a pair of spaced-apart parallel side walls extending away from the base and forming an opening, the respective openings facing outwardly in opposite directions and the base of each channel being common to one another;
  in each channel, the inside of each side wall having an inner slot located adjacent the base to provide for flexing of the side wall, an outer slot located closely adjacent the outer end of the wall for use in mounting a cover on the channel and an intermediate slot being inboard of the second slot being for use mounting a receptacle retainer, the respective pairs of inner, outer and intermediate slots facing one another;
  a plurality of receptacles disposed in one of said channels;
  a pair of covers respectively removably mounted on said side walls and extending across the openings of said channels to close off the same and each said opening providing access to its channel with the cover removed and the channels and covers forming elongated compartments for carrying electrical conductors, the cover in said one channel having a plurality of openings through which respectively extend portions of said electrical receptacles;
  each cover being removably mounted on the side walls by a pair of fingers disposed on the inside of the cover adjacent opposite edges and respectively engaged with said side walls and with said outer slots, the transverse dimension between fingers being greater than the distance between the side walls whereby the side walls are outwardly flexed and provide force for holding the cover in place; and
  a plurality of receptacle retainers each made of flexible material and there being one retainer for each receptacle; and
  each retainer being characterized by a flat mid-section having an aperture through which extends a portion of the receptacle and by a pair of legs respectively extending away from the flat section and the outer edges of the legs respectively being disposed in said intermediate slots, the distance between the outer edges being greater than the distance between intermediate slots whereby the legs are flexed and provide force for holding the retainer in place.

3. A service pole for supplying power and/or telephone outlets in a room of a building structure, the pole being adapted to extend between the floor and the ceiling of a room and the ceiling being the suspended type having means for supporting ceiling panels, the pole comprising:
  an elongated, extruded aluminum frame formed with a pair of back-to-back channels, each channel having a base and a pair of spaced-apart parallel side walls extending away from the base and forming an opening, the respective openings facing outwardly in opposite directions and the base of each channel being common to one another;
  in each channel, the inside of each side wall having an inner slot located adjacent the base to provide for flexing of the side wall, an outer slot located closely adjacent the outer end of the wall for use in mounting a cover on the channel and an intermediate slot being inboard of the second slot being for use mounting a receptacle retainer, the respective pairs of inner, outer and intermediate slots facing one another;
  at least a pair of duplex electrical receptacles disposed end-for-end in one of said channels;
  a pair of covers respectively removably mounted on said side walls and extending across the openings of said channels to close off the same and each said opening providing access to its channel with the cover removed and the channels and covers forming elongated compartments for carrying electrical conductors, the cover in said one channel having a plurality of openings through which respectively extend portions of said electrical receptacles;
  each cover being removably mounted on the side walls by a pair of fingers disposed on the inside of the cover adjacent opposite edges and respectively engaged with said side walls and with said outer slots, the transverse dimension between fingers being greater than the distance between the side walls whereby the side walls are outwardly flexed and provide force for holding the cover in place;
  for said pair of receptacles, three receptacle retainers, one retainer being disposed between the pair of receptacles and respectively connected thereto and another retainer being disposed on the end of one receptacle and connected thereto and the other of the retainers being disposed on the end of the other receptacle and connected thereto; and
  each retainer being characterized by a flat mid-section and by a pair of legs respectively extending away from the flat section and the outer edges of the legs respectively being slidably disposed in said intermediate slots.

* * * * *